Patented Nov. 30, 1937

2,100,533

UNITED STATES PATENT OFFICE 2,100,533

CONDENSATION PRODUCTS OF 1-AMINO-ANTHRAQUINONE 2-PHENYL AZOMETHINE

Alexander J. Wuertz, Carrollville, Wis., assignor to E. I. du Pont de Nemours & Company, Wilmington, Del., a corporation of Delaware No Drawing. Application February 23, 1937, Serial No. 127,201

3 Claims. (Cl. 260—60)

This invention relates to the preparation of new and valuable compounds of the anthraquinone series and more particularly to the preparation of dianthraquinonylamino compounds containing a 1 - aminoanthraquinone - 2 - phenylazomethine grouping.

According to the present invention, 1-aminoanthraquinone-2-phenylazomethine compounds are condensed with halogen anthraquinones which may contain simple monovalent substituents such as amino, acidylamino, alkylamino, methyl, hydroxy, or further halogen substituents, to give compounds which in themselves are dyestuffs and which serve as valuable intermediates for the preparation of other dyestuffs. The products are in the main well defined crystalline compounds, some of which possess fair tinctorial strength and dye in fast shades. The condensation is effected in any inert high-boiling solvent, such as naphthalene, chlorobenzene, nitrobenzene, etc., by the use of copper or copper salts as a catalyst and soda ash as an acid binding agent. The reaction is carried out at temperatures and under the conditions normally employed for the preparation of anthrimide compounds and the products are crystallized from the solvent on cooling, or by the addition of alcohol or by steam distillation of the reaction mass to free the same from the organic solvents.

The object of the invention is to provide new and valuable dyestuff intermediates which in themselves have dyestuff properties.

The following examples are given to more fully illustrate the invention. The parts used are by weight.

Example 1

32.6 parts of 1-aminoanthraquinone-2-phenylazomethine, 36.1 parts of 1-chloro-5-benzoylaminoanthraquinone, 15 parts sodium carbonate and 3 parts cuprous chloride are heated at 205° C. for 4 hours in 680 parts nitrobenzene. The mass is cooled to 25° C., the bronze colored crystals filtered off, washed with alcohol and then hot water, after which they may be dried on the steam bath. The product thus obtained dissolves in sulfuric acid (95%) imparting a red color which turns to a deeper red on warming to 100° C. The body forms a red-violet colored vat with sodium hydroxide and sodium hydrosulfite, from which it dyes cotton in bordeaux shades after oxidation by exposure to air. With anhydrous aluminum chloride in cold nitrobenzene an orange solution results.

Example 2

38.8 parts 1-aminoanthraquinone-2-phenylazomethine, 38.5 parts 1-amino-2,4-dibromoanthraquinone, 35 parts soda ash, 3.5 parts cuprous chloride in 700 parts nitrobenzene are heated to 205° C. over a period of 3 hours, and held at this temperature for 4 hours. The solution is cooled to 25° C. and the product isolated by steam distilling the solvent and filtering the water insoluble residue. An alternative means is to dilute with a large volume of ethyl alcohol and filter. The resulting product, after drying, is a gray powder dyeing cotton gray shades from a reddish brown vat. It dissolves in nitrobenzene with a gray coloration. In 95% sulfuric acid it is also soluble to give a dull gray colored solution.

Example 3

13.8 parts 2,6-dichloroanthraquinone (M. P. 295° C.), 32.7 parts 1-aminoanthraquinone-2-phenylazomethine, 25 parts soda ash and 2 parts cuprous chloride are heated at 200–205° C. for 2 hours. The reaction is filtered cold and washed with alcohol and then hot water. After drying, a chocolate brown crystalline powder is obtained. The crystals are bordeaux in color, giving a carmen red colored solution when dissolved in 95% sulfuric acid, which does not change when heated to 125° C. On diluting the acid solution, bordeaux flocks are precipitated. The product is insoluble in hot nitrobenzene. It dissolves in cold nitrobenzene in the presence of anhydrous aluminum chloride, giving a bordeaux red colored solution. It gives a green vat from which cotton is dyed in bordeaux shades fast to bleach and chlorine.

The following substituted halogen anthraquinones when reacted in the above manner with 1-aminoanthraquinone-2-phenylazomethine give compounds which have the following properties:

| Intermediate form | Physical form | Color in $H_2SO_4$ | Color of vat | Color in N. B. | Dye color |
|---|---|---|---|---|---|
| 1,5-dichloro-anthraquinone | Red crystals | Green | Red-brown | Sl. soluble with wine color | Pink |
| 1-methyl-amino-2,4-dibromoanthraquinone | Black powder | Brown | Brown | Brown-red | Bluish gray |
| 2-chloro-quinizarine | Red crystals | Red | Red-orange | Bordeaux | Pink |
| 1-amino-2-methyl-4-bromoanthraquinone | Bluish gray | Greenish blue | Reddish gray | Reddish gray | Bluish gray |
| 1,5-dichloro-anthrarufin | Red bars | Bordeaux | Olive | Orange | Bluish gray |
| 1-chloro-4-benzoylamino-anthraquinone | Blue crystals | Purple in 95% | Red-violet | Sl. soluble bluish gray | Blue |

In the table given above, where a dihalogen compound is employed two molecular quantities of 1-aminoanthraquinone-2-phenylazomethine are condensed therewith. It is of course understood that the examples above given are merely illustrative of the invention and that other simple substituted halogen anthraquinones may be substituted for those specifically mentioned, such as dichloroquinizarine, 1-amino-6-chloroanthraquinone, 1-benzoylamino-6-chloroanthraquinone, 1-amino-8-chloroanthraquinone, 1-benzoylamino-4,6-dichloroanthraquinone and 1-oxy-4-chloro-anthraquinone.

I claim:

1. Compounds obtainable by the condensation of a halogen-anthraquinone with 1-aminoanthraquinone-2-phenylazomethine.

2. Compounds obtainable by the condensation of an amino-substituted halogen-anthraquinone with 1-aminoanthraquinone-2-phenylazomethine.

3. Compounds obtainable by the condensation of an alpha-amino-alpha-halogen-anthraquinone with 1-aminoanthraquinone-2-phenylazomethine.

ALEXANDER J. WUERTZ.